Dec. 24, 1963  F. R. MORTIMER  3,115,156
FLUID PRESSURE SURGE DAMPERS PARTICULARLY FOR BRAKING SYSTEMS
Filed June 15, 1961  2 Sheets-Sheet 1

INVENTOR
Frank Radcliff Mortimer
by Benj. T. Rauber
his attorney

Dec. 24, 1963  F. R. MORTIMER  3,115,156
FLUID PRESSURE SURGE DAMPERS PARTICULARLY FOR BRAKING SYSTEMS
Filed June 15, 1961  2 Sheets-Sheet 2

INVENTOR
Frank Radcliffe Mortimer
by Benj. J. Rauber
his attorney ns patent office
3,115,156
Patented Dec. 24, 1963

3,115,156
FLUID PRESSURE SURGE DAMPERS PARTICULARLY FOR BRAKING SYSTEMS
Frank Radcliffe Mortimer, Coventry, England, assignor to Dunlop Rubber Company Limited, London County, England, a British company
Filed June 15, 1961, Ser. No. 117,428
Claims priority, application Great Britain June 29, 1960
7 Claims. (Cl. 137—513.3)

This invention relates to fluid pressure dampers for the purpose of damping out pressure surges in braking systems, particularly braking systems incorporating anti-skid devices.

Dampers for braking systems which include anti-skid devices are known. These have been disposed in a fluid-pressure pipe leading to the anti-skid device and have made use of a piston movable along a cylinder filled with brake fluid and operable to damp a pressure surge passing along the pipe and entering the cylinder at the supply end thereof. The piston having moved a predetermined distance without restricting the flow is adapted to cause a restrictor, adapted to limit the subsequent flow, to come into action. This known type of damper is usually an independent unit and is interposed in the feed supply to the brake at some convenient point.

The object of the invention is to provide a fluid pressure damper which is small, cheap to manufacture and can conveniently be incorporated into any part of a brake system such as an anti-skid unit.

According to the present invention a fluid pressure damper for use in association with a brake anti-skid mechanism comprises a cylindrical shuttle member slidable in a bore of a housing and having a constantly-open flow-restricting passage formed axially therethrough to permit fluid from a pressure source to enter said anti-skid mechanism and movable in one direction by spring means to open a second substantially non-restricting passage also to allow fluid from a pressure source to enter said anti-skid mechanism and movable in the opposite direction in response to a pressure surge to close said second passage and divert said fluid through said flow-restricting passage to damp said surge.

Preferably the flow-restricting passage is formed from a series of plates spaced apart from each other and each having a small hole formed therethrough the holes being drilled at the centre and off centre of succeeding plates.

The invention will now be described with reference to the accompanying drawings of which:

Figure 1:
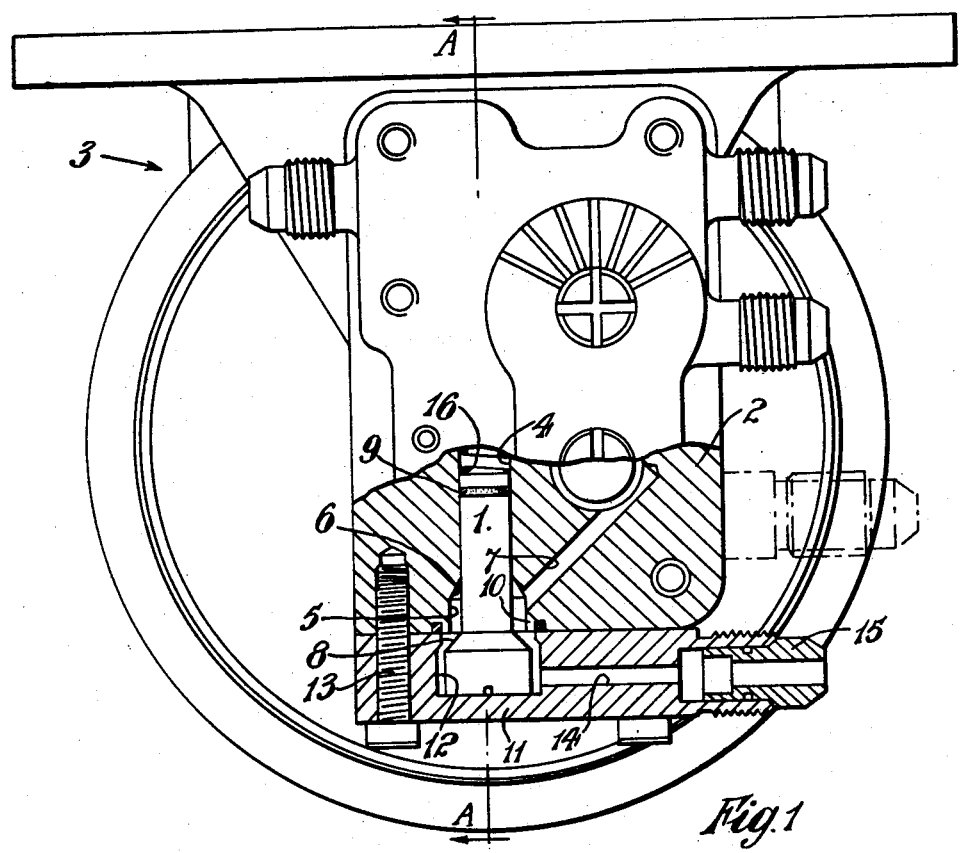
FIGURE 1 shows a part-sectioned elevation of an anti-skid mechanism incorporating a fluid pressure damper according to the invention within its housing.
Figure 2:
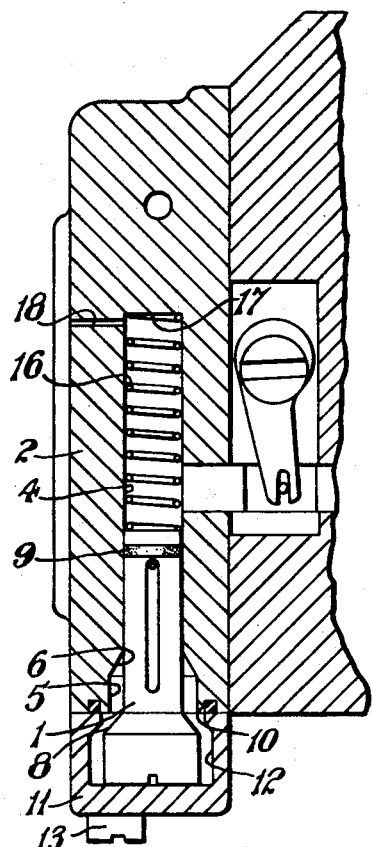
FIGURE 2 is a part-section of the housing on line A—A of FIGURE 1.

A shuttle 1 of a damper according to the invention is located in a bore formed in a housing 2 of an anti-skid mechanism 3. The bore is formed as a smaller diameter part 4 and a larger diameter part 5 and has a frusto-conical tapering portion 6 joining these two parts. An outlet passage 7 from the damper intersects the bore where the larger diameter part 5 and the tapering portion 6 meet.

The shuttle 1 is also formed in two diameters joined by a frusto-conically tapering portion 8 the smaller diameter portion of the shuttle being fluid-tightly slidable in the smaller diameter part 4 of the bore by virtue of an annular sealing member 9 disposed in a groove near the smaller diameter end of the shuttle. The larger diameter part of the bore is smaller than the larger diameter part of the shuttle so that the conical portion 8 can seat on the lip 10 of the bore to prevent passage of fluid therebetween, the lip 10 forming a valve seat for the tapering portion 8 of the shuttle which acts as a valve.

The bore in the housing is closed by a cover plate 11 having a cavity 12 so formed as to be in register with the bore when the plate is fluid-tightly secured to the housing by bolts 13. The cavity 12 receives the larger diameter end of the shuttle 1 and is connected via a supply passage 14 and a pipe union 15 to a source of fluid pressure supply for the brakes. A coiled helical spring 16 of suitable strength bears axially on the smaller diameter end of the shuttle and the blind end of the bore 17 and urges the larger diameter end into the cavity 12. The portion of the bore in which the spring is situated is connected to atmosphere by vent 18. This is to ensure that no back pressure is set up above the shuttle to prevent its full travel.

Figure 3:
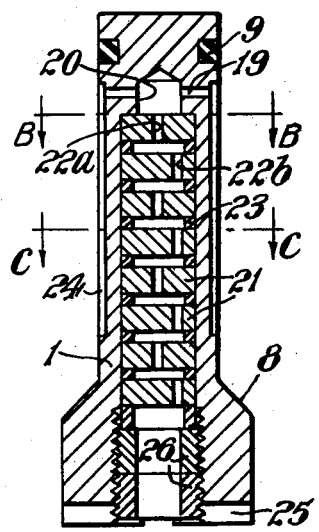
FIGURE 3 is a cross-section on the centre line of a shuttle which constitutes a part of the damper.
Figure 4:
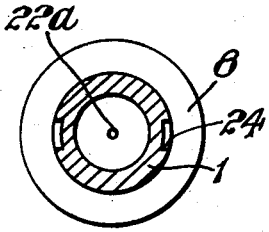
FIGURE 4 is a cross-section through the shuttle on the line B—B.
Figure 5:
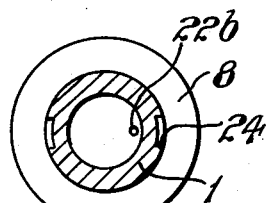
FIGURE 5 is a cross-section through the shuttle on the line C—C.
Figure 6:
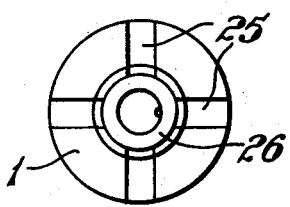
FIGURE 6 is a view of the shuttle in the direction of arrow D.

The shuttle has a transverse hole 19 (FIGURE 3) formed near its smaller diameter end below the seal 9. The transverse hole 19 intersects a blind axially formed hole 20 which opens at the bottom or larger diameter end of the shuttle. The blind hole 20 receives a baffle or restrictor which restricts the flow of fluid through the holes 19 and 20. The restrictor comprises a series of plates 21 pierced by small holes 22a and 22b, and spaced apart from one another by spacing rings 23. Alternate plates have holes 22a drilled at their centres while the plates in between them have holes 22b drilled off centre. The restrictor is retained in position by hollow screws 26 engaging a threaded opening of the blind hole 20.

The outer surface of the smaller diameter portion of the shuttle has a pair of grooves 24, extending axially away from the transverse hole 19 in the direction of the larger diameter end of the shuttle so that the transverse hole is always connected to the inlet passage 7 of the anti-skid device. The larger diameter end of the shuttle 1 abuts the floor of the cavity 12 and has radial grooves 25 formed on its base to provide a fluid passage from the cavity 12 to the bore.

The operation is as follows. During normal operation the shuttle 1 is spring-urged into the cavity 12 by the coil spring 16 and fluid is allowed to flow between the conical portion 8 and the lip 10 into the outlet 7. When a pressure surge reaches the cavity 12 it acts upon the base of the shuttle 1 and forces the conical portion 8 into contact with the lip 10 thus diverting the flow of fluid through the restrictor to the anti-skid mechanism. The restrictor in the shuttle dissipates the pressure energy of the surges and fluid flows from the transverse holes 19 and along the axial grooves 24 to the outlet 7. The outlet side of the damper is thus isolated from any pressure surges which may cause damage.

The invention need not be incorporated into the housing of an associated mechanism but may be in its own housing positioned in the pipe between the source of pressure and the associated mechanism.

The present damper can be made very easily and cheaply. A further feature is that the device is very compact and light. These are advantageous where aircraft equipment is concerned as ancillary devices of this nature require to be mounted unobtrusively and they must not constitute a weight penalty for the aircraft as a whole.

Having now described my invention, what I claim is:
1. A fluid pressure damper comprising a housing having a valve seat, an inlet to one side of said valve seat, an unrestricted outlet from the other side of said valve seat and a blind bore extending from said outlet side of said valve seat to a closed end and having an opening near said closed end through said housing to the exterior thereof, a hollow shuttle slidable fluid-tightly in said bore and having a valve to seat on said valve seat upon movement of said shuttle towards said closed end to close said outlet from said inlet, said shuttle being open to said inlet and closed at its opposite end and having a restricted passage from said open end to said outlet; and a spring in said bore biasing said shuttle to lift said valve free from said valve seat to provide an unrestricted passage from said inlet to said outlet, said shuttle being slidable in said bore to close said valve onto said valve seat when the pressure in said inlet is sufficient to overcome the force of said spring.

2. A fluid pressure damper comprising a housing having an inlet, a bore extending from said inlet and forming an annular valve seat at said inlet and having an unrestricted outlet from within said bore, said bore being stepped to a smaller diameter beyond said outlet and having an opening to atmosphere near its end farthest from said inlet, a hollow shuttle slidable fluid-tightly in the smaller diameter part of said bore and extending into said inlet and having a valve to seat on said valve seat upon movement of said shuttle toward said outlet to close said outlet from said inlet, said shuttle being open to said inlet and closed at its opposite end and having a restricted passage from said open end to said outlet; and a spring in said stepped smaller diameter portion of the bore biasing said shuttle to lift said valve free from said valve seat to provide an unrestricted passage from said inlet to said outlet, said shuttle being slidable in said bore to close said valve onto said valve seat when the pressure in said inlet is sufficient to overcome the force of said spring.

3. A fluid pressure damper comprising a housing having an inlet chamber, a bore having a part of larger diameter opening from said inlet chamber and forming an annular valve seat at said inlet chamber and a part of narrower diameter extending from, and aligned with said part of larger diameter and having an outlet to the atmosphere beyond said larger diameter part and an outlet passage from said larger diameter part; a hollow shuttle having a valve in said inlet chamber movable to seat on said valve seat and a portion extending through said larger diameter part of said bore to provide an annular outlet chamber and into said narrower diameter part of said bore sliding fluid-tightly therein and being closed at its end remote from said valve, said shuttle having a restricted passage from said inlet chamber to said outlet chamber; and a spring in said narrower diameter part of said bore biasing said shuttle to lift said valve from said valve seat, said valve being movable onto said valve seat by a fluid pressure in said inlet chamber sufficient to overcome the force of said spring.

4. The fluid pressure damper of claim 3 in which said restricted passage of said shuttle comprises a series of discs spanning the interior of said shuttle and spaced axially of said shuttle, each said disc having an opening off-set from the openings of adjacent discs.

5. The fluid pressure damper of claim 4 in which said shuttle has a transverse opening from a space between its closed end and said discs and a groove in its outer surface extending from said transverse opening to the larger diameter part of said bore and has a sealing ring in its outer surface between said transverse opening and the closed end of said shuttle.

6. The fluid pressure damper of claim 5 in which said bore has a tapering portion from said part of larger diameter to the part of smaller diameter and said valve of said shuttle has a tapering surface to seat on said valve seat.

7. The fluid pressure damper of claim 6 in which said inlet chamber has a surface opposite said bore to support said valve and shuttle and said valve has grooves to transmit fluid pressure between said supporting surface and said valve.

References Cited in the file of this patent

UNITED STATES PATENTS

| | | |
|---|---|---|
| 920,716 | Beckman | May 4, 1909 |
| 922,578 | Gries | May 25, 1909 |
| 1,583,404 | Lovejoy | May 4, 1926 |
| 2,676,573 | Abbe | Apr. 27, 1954 |

FOREIGN PATENTS

| | | |
|---|---|---|
| 524,384 | Belgium | Dec. 15, 1953 |
| 1,145,218 | France | May 6, 1957 |